July 4, 1950  B. C. COIT, JR  2,513,452
COMBINED PALLET AND CRATE STRUCTURE
Filed Feb. 18, 1947  6 Sheets-Sheet 1

Inventor
BURTON C. COIT, JR.
By Archworth Martin
his Attorney

July 4, 1950 — B. C. COIT, JR — 2,513,452
COMBINED PALLET AND CRATE STRUCTURE
Filed Feb. 18, 1947 — 6 Sheets-Sheet 2

Inventor
BURTON C. COIT, JR
By Archworth Martin
his Attorney

July 4, 1950     B. C. COIT, JR     2,513,452
COMBINED PALLET AND CRATE STRUCTURE
Filed Feb. 18, 1947     6 Sheets-Sheet 3

Inventor
BURTON C. COIT, JR.
By Archworth Martin
his Attorney

INVENTOR.
BURTON C. COIT, JR.

July 4, 1950 B. C. COIT, JR 2,513,452
COMBINED PALLET AND CRATE STRUCTURE
Filed Feb. 18, 1947 6 Sheets-Sheet 6

Inventor
BURTON C. COIT, JR.
By Archworth Martin
His Attorney

Patented July 4, 1950

2,513,452

UNITED STATES PATENT OFFICE 2,513,452

COMBINED PALLET AND CRATE STRUCTURE

Burton C. Coit, Jr., Washington, Pa., assignor to Tri-State Engineering Company, Washington, Pa., a corporation of Maryland Application February 18, 1947, Serial No. 729,315

4 Claims. (Cl. 248—120)

This invention relates to pallets or portable platforms such as those used in the stacking and handling of articles such as packages, and more particularly to the provision of a crate-like structure in conjunction with a pallet deck. The application comprises an improvement upon and a modification of my application Serial No. 726,687, filed February 5, 1947 (now Patent 2,471,095).

One object of my invention is to provide a combined pallet and crate structure wherein the side and end walls of the crate can readily be connected to and disconnected from the deck of the pallet and which walls are conveniently foldable or collapsible when removed from the pallet, for convenience of storing and shipping in an empty condition.

Another object of my invention is to provide an arrangement of the character referred to in the preceding paragraph wherein the foldable walls are firmly held against relative displacement, when in use, and the provision of an improved means for preventing relative shifting of each pallet and crate unit when in superposed or stacked relation to another unit, and wherein there is adequate distribution of weight from an upper pallet to the crate walls of another pallet upon which the first-named pallet is stacked.

Figure 1:
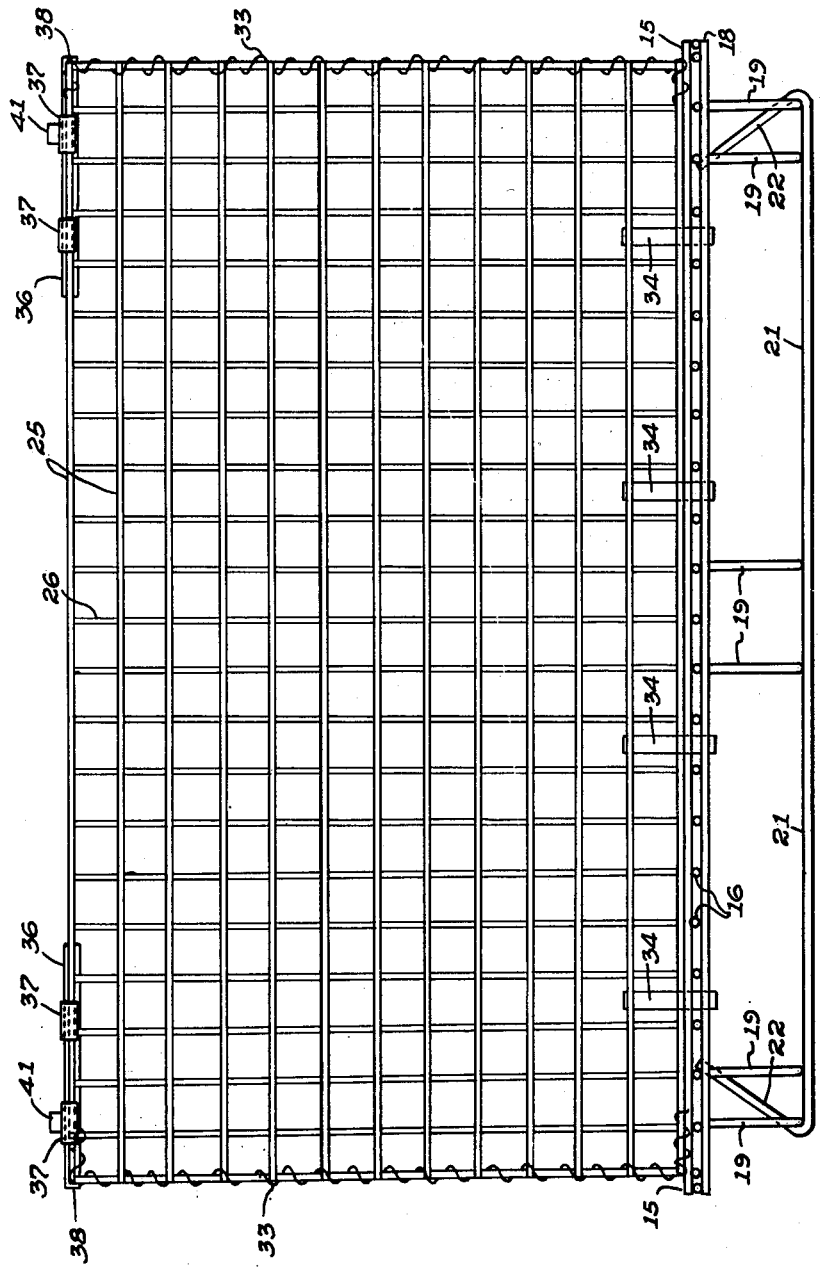
Figure 2:
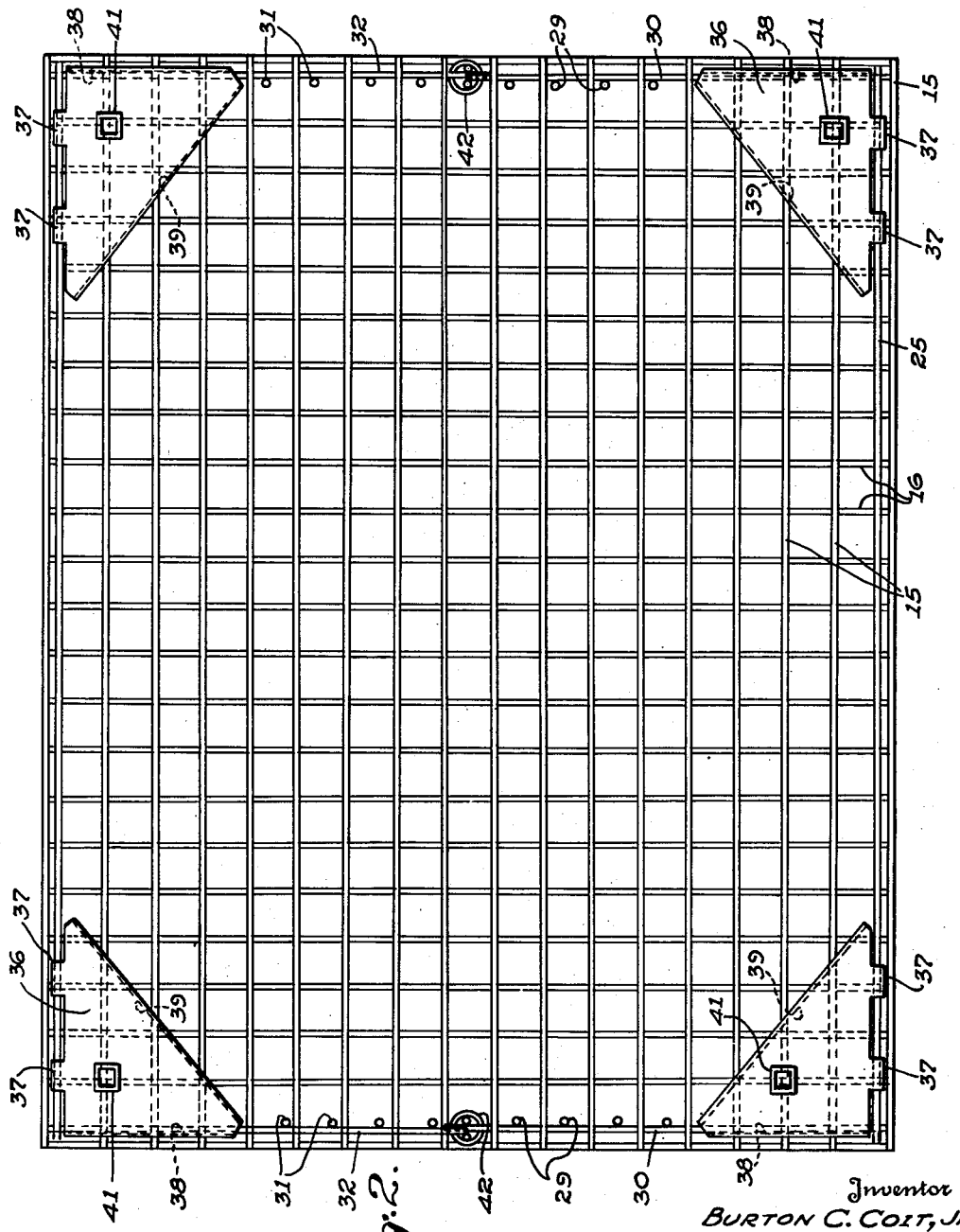
Figure 3:
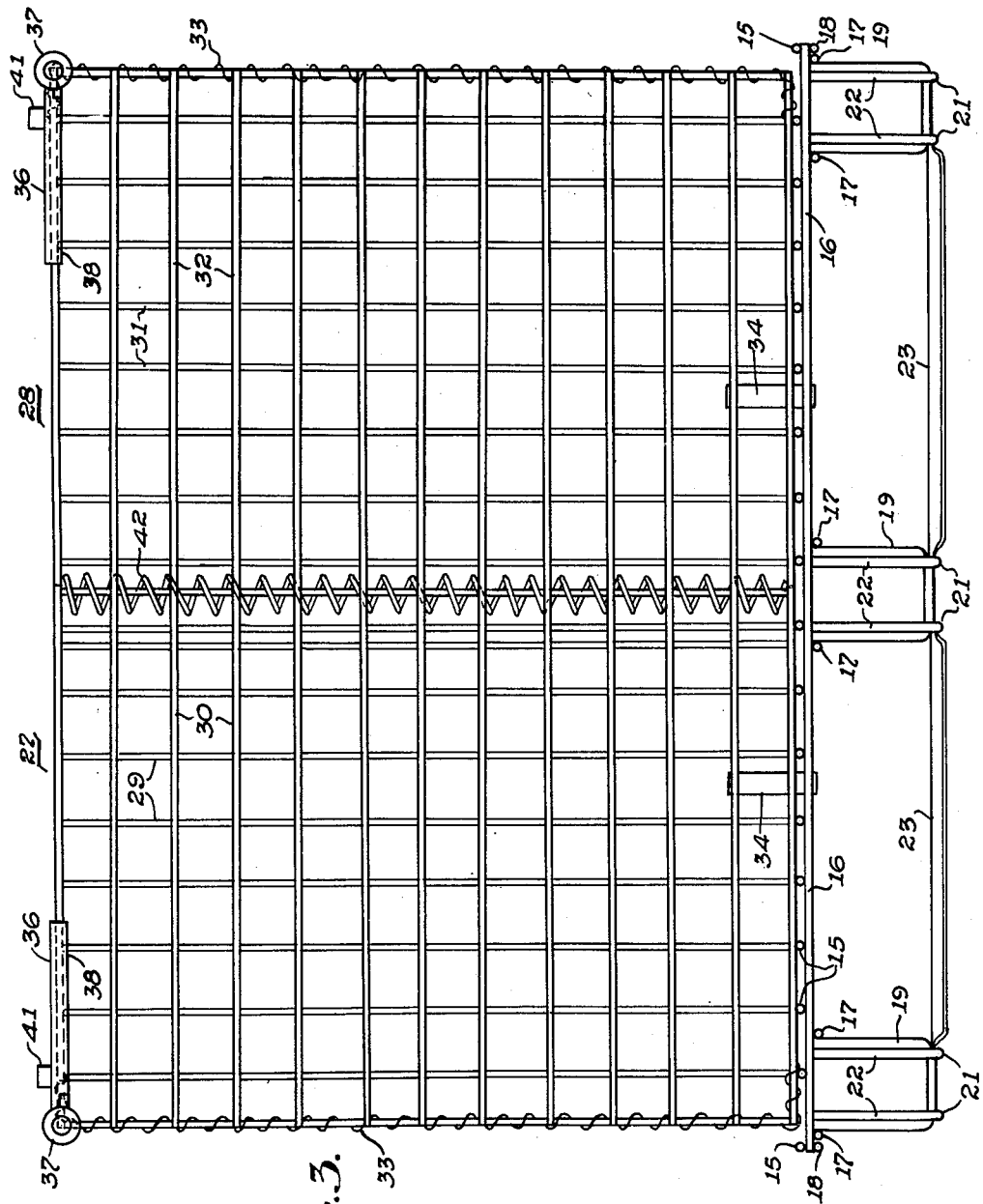
Figure 4:
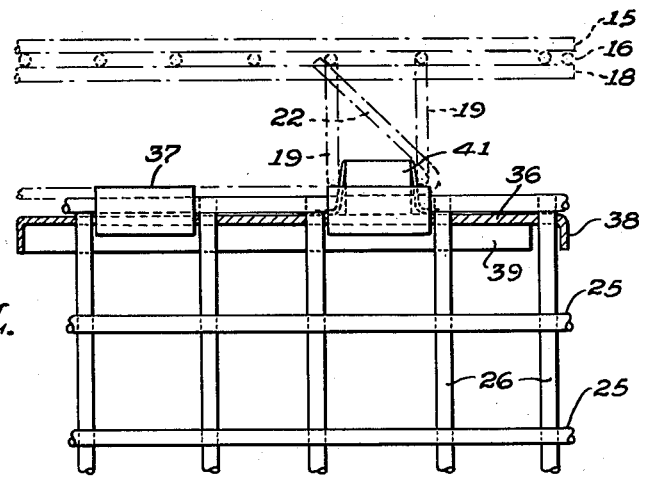
Figure 5:
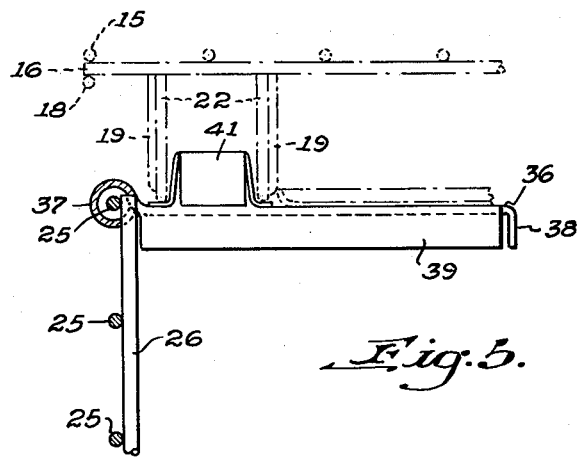
Figure 13:
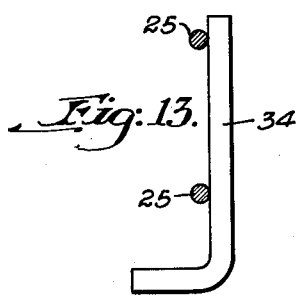
Figure 14:
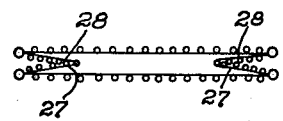
Figure 6:
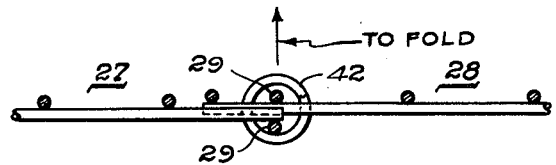
Figure 7:
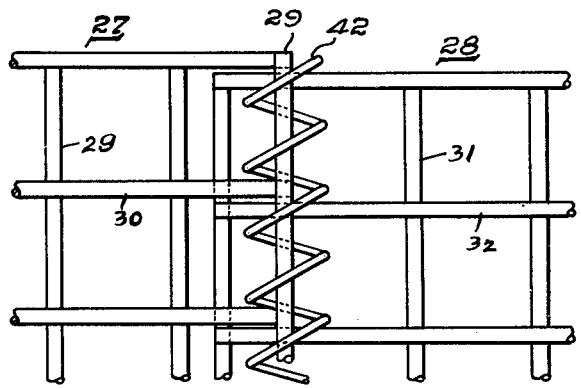
Figure 8:
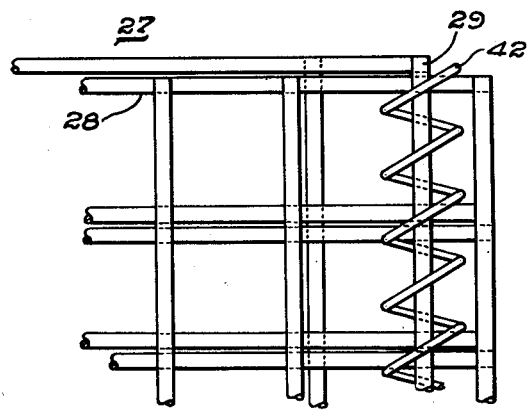
Figure 9:
Figure 10:
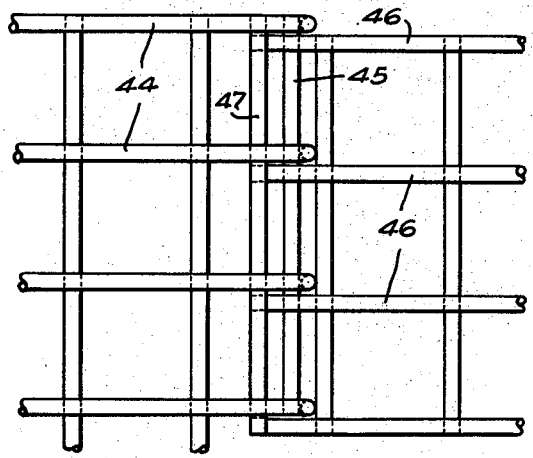
Figure 11:
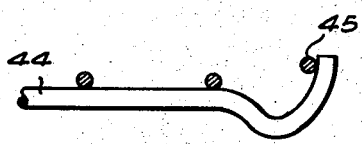
Figure 12:
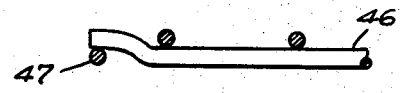

Some of the forms which my invention may take are shown in the accompanying drawings wherein Figure 1 is a side view of a pallet and crate unit embodying my invention; Fig. 2 is a plan view thereof; Fig. 3 is an end view of the structure of Fig. 1; Fig. 4 is an enlarged side view, partly in section, of an upper corner portion of the structure of Fig. 1 showing the manner in which a pallet is stacked upon the crate walls of another pallet; Fig. 5 is an end view of the structure of Fig. 4; Fig. 6 is a plan view showing the hinge-like connection of the panels of the end walls of Figs. 2 and 3; Fig. 7 is an end elevational view thereof; Fig. 8 shows the panels of Figs. 6 and 7 folded upon one another; Fig. 9 is a sectional plan view showing a modification of the hinge joint of Fig. 6; Fig. 10 is a fragmentary face view thereof; Figs. 11 and 12 are plan views respectively showing the panel elements of Fig. 9 in disassembled relation; Fig. 13 shows one of the hooks for detachably holding the crate walls of Figs. 1 and 3 in place on the pallet deck, on an enlarged scale, and Fig. 14 is a view on a greatly reduced scale showing the crate walls of Figs. 1 and 3 in folded or collapsed condition when they have been removed from the pallet deck.

The pallet may be of various known suitable forms but is here shown as comprising longitudinally-extending deck bars 15 overlying and welded to transversely-extending deck bars 16, there being additional longitudinally-extending bars 17 and 18 welded to the undersides of the transverse bars 16 to stiffen and support the deck. Pairs of U-shaped leg elements 19 have their ends welded to the deck bars 16 and 17, and floor bars 21 are welded to the undersides of the legs 19, the end portions of these floor bars being bent back at 22 and welded to the deck bars and the adjacent legs. At desired intervals, floor plates 23 extend crosswise of the pallet structure and are welded to the floor bars 21.

The structure as thus far described, can be used without crate walls, in the manner of ordinary pallets that are lifted, transported and stacked by trucks of the liftfork type.

The crate has side walls here shown as comprising longitudinally-extending wires or rods 25 welded to vertically-extending wires 26. The end walls of the crate comprise panels 27 and 28. The panel 27 is formed of vertical wires 29 welded to horizontal wires 30 while the panel 28 has its vertical wires 31 welded to horizontal wires 32.

At the corners of the crate, the panels 27—28 are pivotally connected to the side walls of the crate, by spiral wires 33 to permit of folding the crate when it has been removed from the deck.

When the walls of the crate are in place upon the deck, they are releasably held thereon against vertical and horizontal displacement by hooks 34 (Fig. 13) that are welded to the lower wires of the crate walls and extend beneath marginal deck wires at the sides and ends of the structure, as shown more clearly in Figs. 1 and 3. When the vertical walls of the crate are partly collapsed or contracted as hereinafter explained, the hooks will be drawn from engagement with the deck rods and the crate can then be lifted from the deck.

At each upper corner of the crate, a plate 36 has hinge connections with the adjacent side wall of the crate by means of knuckles 37 on the plate which embrace the uppermost wires 25 as shown more clearly in Figs. 4 and 5. Each plate has a pair of down-turned flanges 38 and 39. When the plates are in horizontal position, their flanges 38 lie against the faces of the end panels 27—28 and thereby hold said panels against being pushed outwardly under the thrust of packages or the like that are contained within the plate. The diagonally-extending flanges 39 hold the end panels against being pushed inwardly.

Stop members 41 are provided on the plates 26 and these may suitably be formed by the upstanding portions of four angular plates whose bases are welded to the plates 26 as shown more clearly in Figs. 4 and 5. The purpose of these stop shoulders is to prevent shifting of the pallets and crates when they are stacked upon one another. As shown in Figs. 4 and 5, when a pallet is placed upon a crate, the lugs 41 will enter between the legs 19 and the floor bars 21 at the lower corner of each pallet.

The panels 27—28 at each end of the crate are pivotally connected by a spiral hinge element 42 that embraces adjacent vertical rods 29 and 31 of the panels, so that the panels can be folded upon one another as shown in Fig. 7.

When it is desired to remove the crate from the pallet deck, the plates 26 will be swung upwardly to permit the end panels to be pushed inwardly at their hinge joint 42 which movements shifts their hooks 34 from engagement with the end rods of the deck, and the other hooks 34 will then be drawn inwardly from engagement with the longitudinal marginal rods of the deck. The crate can then be folded as shown schematically in Fig. 14, for storage or shipment.

In Figs. 9 to 12, I show another form of hinge connection between the end panels of the crate, this arrangement being substituted for the spiral hinge member 42. In this arrangement, the horizontally-extending wires 44 of one end panel are bent at their ends and have welded thereto a vertical rod 45, while the horizontal wires 46 of the other panel has a vertical rod 47 welded thereto, thus providing a hinge joint which will permit folding of the end panels upon one another in the manner shown in Fig. 14. In assembling the structure, either the rod 45 or the rod 47 is omitted until after the wires 46 have been placed in their interspersed relation. Thereupon, the rod 45 or the rod 47 as the case may be will be welded to its associated horizontal wires.

I claim as my invention:

1. A combined pallet and crate structure comprising a pallet having a deck with vertically-extending openings, vertical crate walls adapted to rest upon the deck, connecting elements on the crate walls projecting downwardly into said openings and having laterally-turned hooks extending into said openings and beneath a portion of the deck, the crate walls being hingedly connected at their corners and the end walls of the crate each comprising vertically-divided panels that are hingedly connected at their adjacent vertical edges, and means adjacent to the upper edges of the walls, for releasably holding said panels against swinging movement relative to the side walls of the crate, the said hooks being disengageable from the pallet deck through release of the panels and movement thereof toward a folded position.

2. A combined pallet and crate structure comprising a pallet having a deck with vertically-extending openings, vertical crate walls adapted to rest upon the deck, connecting elements on the crate walls projecting downwardly into said openings and having laterally-turned hooks extending into said opening and beneath a portion of the deck, the crate walls being hingedly connected at their adjacent vertical edges, and means adjacent to the upper edges of the walls, for releasably holding said panels against swinging movement relative to the side walls of the crate, the said hooks being disengageable from the pallet deck through release of the panels and movement thereof toward a folded position, the said releasable holding means comprising plates positioned at the upper edges of the crate sides, movable to and from horizontal positions and provided with interlocking elements positioned to prevent relative pivotal movements of the panels and the crate walls, when the plates are in horizontal position.

3. A combined pallet and crate structure comprising a pallet having a deck with vertically-extending openings, vertical crate walls adapted to rest upon the deck, connecting elements on the crate walls projecting downwardly into said openings and having laterally-turned hooks extending into said openings and beneath a portion of the deck, the crate walls being hingedly connected at their corners and the end walls of the crate each comprising vertically-divided panels that are hingedly connected at their adjacent vertical edges, and means adjacent to the upper edges of the walls, for releasably holding said panels against swinging movement relative to the side walls of the crate, the said hooks being disengageable from the pallet deck through release of the panels and movement thereof toward a folded position, the said releasable holding means comprising plates positioned at the upper edges of the crate sides, movable to and from horizontal positions and provided with interlocking elements positioned to prevent relative pivotal movements of the panels and the crate walls, when the plates are in horizontal position and to cooperate with the said hooks in resisting horizontal displacement of the crate walls when they are assembled on a deck.

4. A combined pallet and crate structure comprising a pallet member having a deck, a crate member having vertical walls supported by the deck, the crate walls being hingedly connected at their corners, means adjacent to the upper edges of the walls, at the corners of the crate, for releasably holding the walls against swinging movement relative to one another, and means for holding the crate member against shifting movement on the pallet member, the last named means comprising vertically-extending hooks carried by one of said members and having laterally-turned ends extending into openings in the other member.

BURTON C. COIT, Jr.

REFERENCES CITED

The following references are of record in the file of this patent:

UNITED STATES PATENTS

| Number | Name | Date |
|---|---|---|
| 923,725 | Sterrett | June 1, 1909 |
| 963,769 | Johnson et al. | July 12, 1910 |
| 1,180,294 | Hunter | Aug. 25, 1916 |
| 1,543,268 | Thieme | June 23, 1925 |
| 1,620,585 | Walther | Mar. 8, 1927 |
| 1,626,009 | Murray | Apr. 26, 1927 |
| 1,755,725 | Clark et al. | Apr. 22, 1930 |
| 1,881,822 | McKelligon | Oct. 11, 1932 |
| 2,154,599 | Beckwith | Apr. 18, 1939 |
| 2,175,390 | Harrison | Oct. 10, 1939 |
| 2,420,640 | Acteson | May 20, 1947 |

FOREIGN PATENTS

| Number | Country | Date |
|---|---|---|
| 46,485 | France | June 4, 1936 |